(12) United States Patent
Anderson

(10) Patent No.: US 11,250,724 B1
(45) Date of Patent: Feb. 15, 2022

(54) DEVICE FOR ASSISTING CHILD SHOE APPLICATION

(71) Applicant: Tracy Anderson, Detroit, MI (US)

(72) Inventor: Tracy Anderson, Detroit, MI (US)

( * ) Notice: Subject to any disclaimer, the term of this patent is extended or adjusted under 35 U.S.C. 154(b) by 207 days.

(21) Appl. No.: 16/360,219

(22) Filed: Mar. 21, 2019

Related U.S. Application Data

(60) Provisional application No. 62/761,529, filed on Mar. 27, 2018.

(51) Int. Cl.
| | |
|---|---|
| *A43C 9/00* | (2006.01) |
| *A43C 7/00* | (2006.01) |
| *G09B 19/00* | (2006.01) |
| *A43B 1/00* | (2006.01) |
| *A43B 3/00* | (2022.01) |

(52) U.S. Cl.
CPC ........ *G09B 19/0076* (2013.01); *A43B 1/0054* (2013.01); *A43B 3/0021* (2013.01); *A43B 3/0094* (2013.01); *A43C 7/00* (2013.01); *A43C 9/00* (2013.01)

(58) Field of Classification Search
CPC ... A43B 1/0054; A43B 3/0094; A43B 3/0021; A43C 7/00; A43C 7/005
See application file for complete search history.

(56) References Cited

U.S. PATENT DOCUMENTS

| | | | |
|---|---|---|---|
| 3,041,743 A * | 7/1962 | Monsma | A41B 11/002 36/1 |
| 5,778,499 A * | 7/1998 | Lehrman | A43B 1/0081 24/712 |
| 10,595,749 B1 * | 3/2020 | Javitt | A61B 5/7415 |
| 2002/0066209 A1 * | 6/2002 | Steed | A43B 17/003 36/44 |
| 2006/0026869 A1 * | 2/2006 | Covington | A43B 3/0005 36/112 |
| 2012/0124867 A1 * | 5/2012 | Heinrich | A43B 3/30 36/136 |
| 2015/0257488 A1 * | 9/2015 | Flores | A43C 9/00 24/713 |
| 2016/0270481 A1 * | 9/2016 | Harden | A43B 1/0054 |
| 2019/0059517 A1 * | 2/2019 | Milton | A43B 3/0094 |

* cited by examiner

*Primary Examiner* — Daniel J Colilla

(57) ABSTRACT

The present invention is a training shoe that teaches children how to distinguish their right foot from their wrong foot and also how to tie their shoe.

5 Claims, 8 Drawing Sheets

DEVICE FOR ASSISTING CHILD SHOE APPLICATION

BACKGROUND

One of the main problems with young children learning to put on their shoes without adult supervision, typically at the age of 2-4 years old, is getting the correct shoe on the correct foot. Sometimes the right shoe is put on the left foot and sometimes the left shoe is put on the right foot. A number of systems have been suggested and some even patented. Usually the systems are devices for placing markers on or within the shoe to distinguishing the right shoe from the left. None of these devices have gained any popularity. The present invention is specifically directed toward a novel approach to distinguishing the proper shoe for a young child to place on the proper foot.

BRIEF SUMMARY

The present invention is comprised of a generally flat device with a pressure sensitive adhesive on one side that may be attached within each shoe, preferably in the area of a particular toe when the shoe is applied. These devices are pressure sensitive so that when a child's foot is placed in the correct shoe, the toe area will overlay the top side of the device and a sensory signal will be generated to indicate to the child that the placement is correct. The sensory signal may be a vibration, noise, or light produced by a pad. Alternatively, the signs can be generated when the child's foot placement is correct.

The sensory sign may be produced either electronically by switch within The pad closed by the correct toe placement or connected to a circuit, preferably a solid state which generates a vibration, an audible sound, or light. The device may be battery powered, employing a very small, long lasting battery similar to the ones used in watches. It may also be mechanical, employing a device that produces a sound or vibration when sensing the pressure of the child's correct toe, preferably the larger big toe.

BRIEF DESCRIPTION

Figure 1:
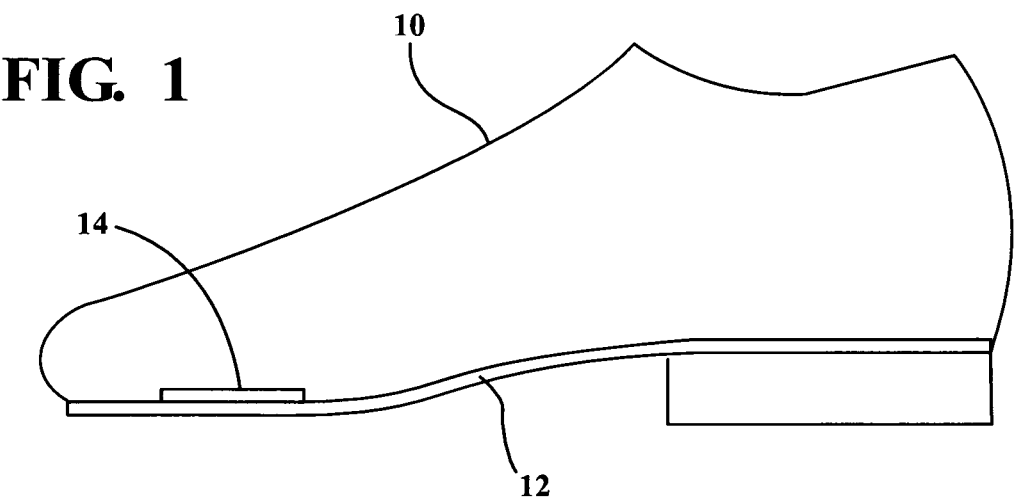
FIG. 1 is an illustration of a side sectional view of the shoe
Figure 2:
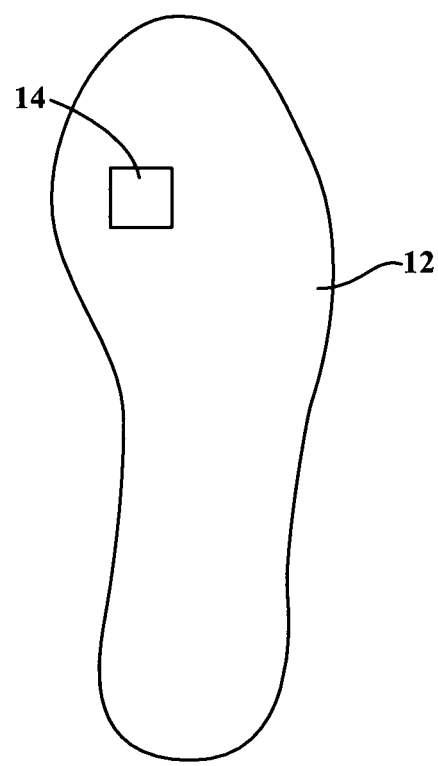
FIG. 2 is an illustration of a top view of the shoe indicating the placement of the sensor device invention.
Figure 3:
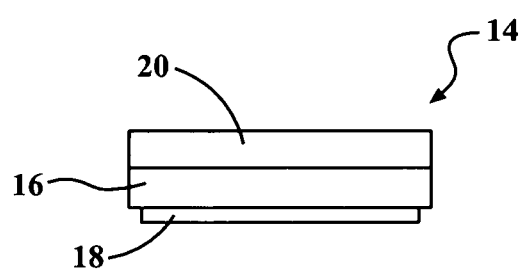
FIG. 3 is an illustration of a side view of the sensor device.
Figure 4:
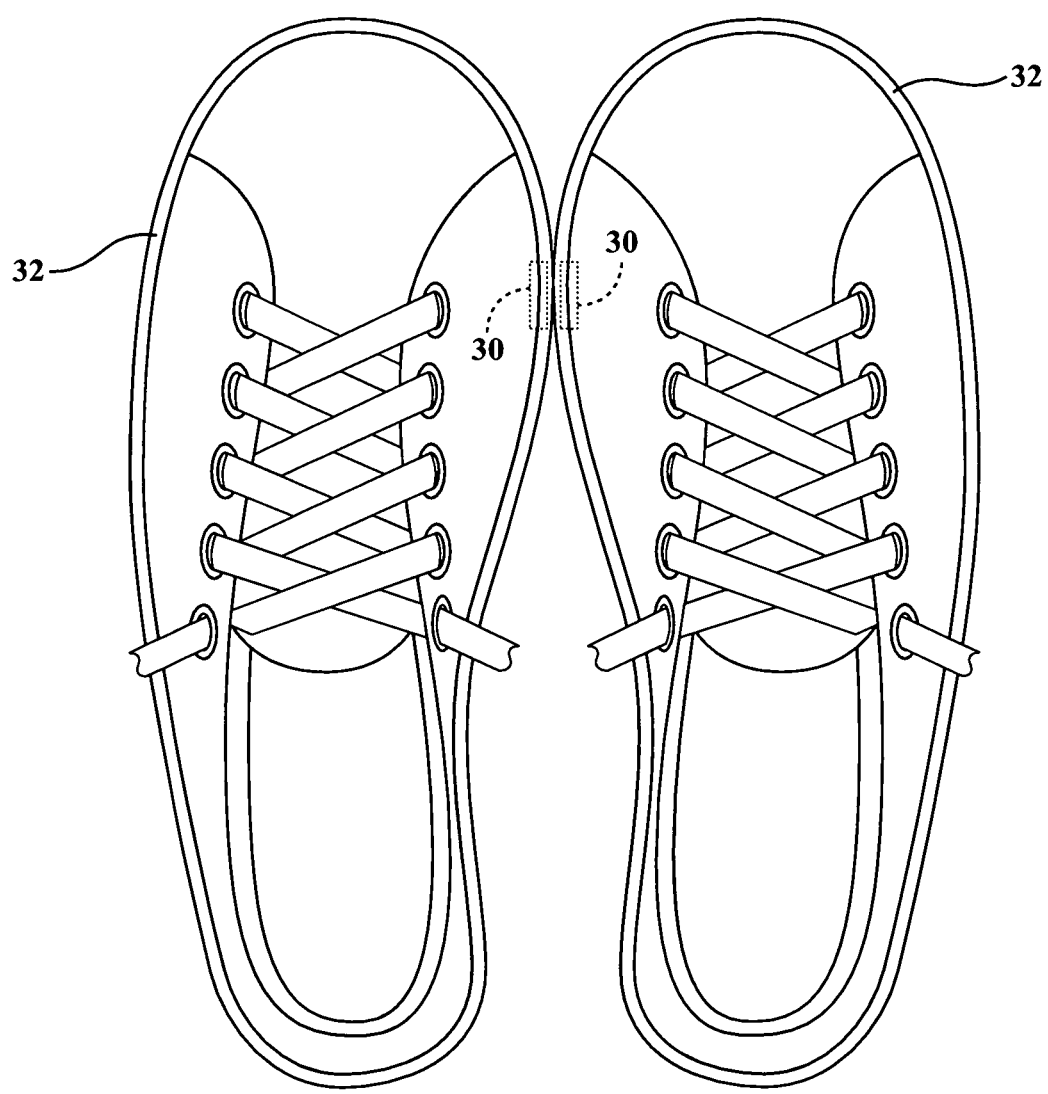
FIG. 4 is an illustration of a top view of the shoe where flat magnets are attached to the outer sole of each shoe so that the magnets attract one another.
Figure 5:
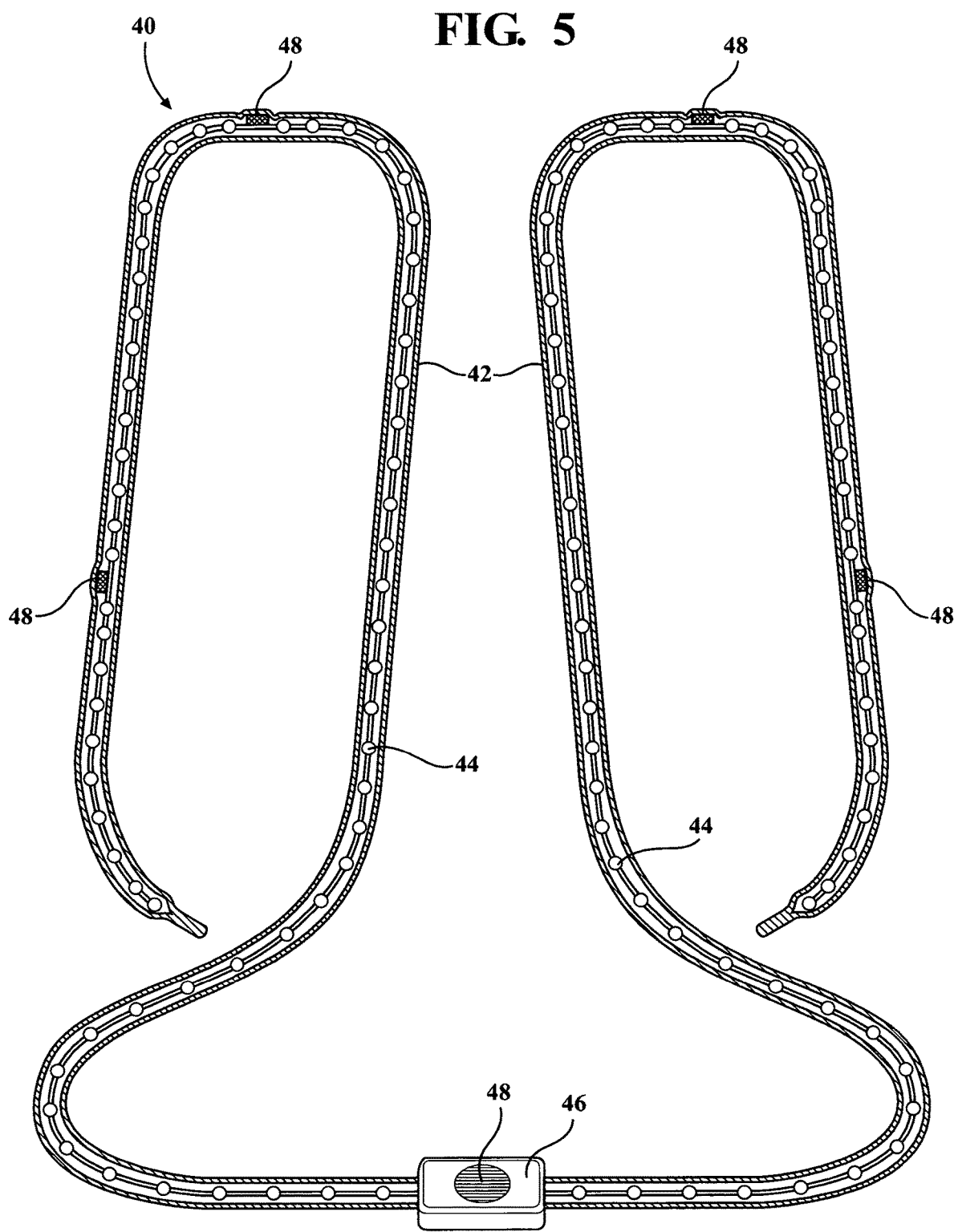
FIG. 5 is an illustration of a shoelace surrounding a series of LED lights that includes four magnets and an audio source with a speaker powered by a battery unit.
Figure 6:
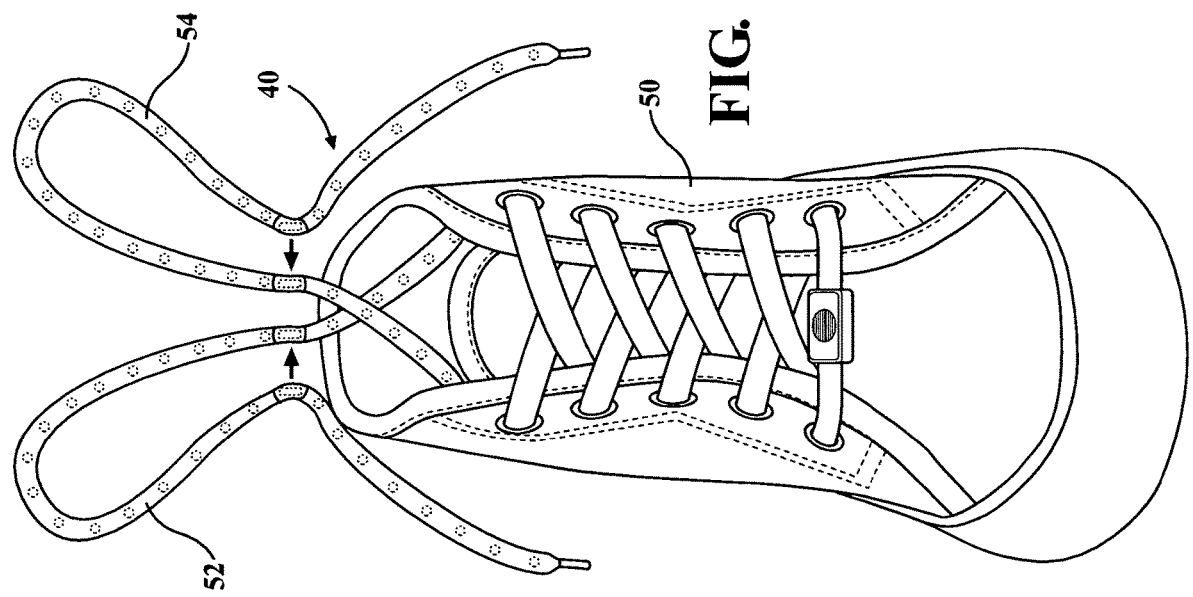
FIG. 6 is an illustration that shows the first step that brings two adjacent magnets on each side of the shoelace together to form two loops.
Figure 7:
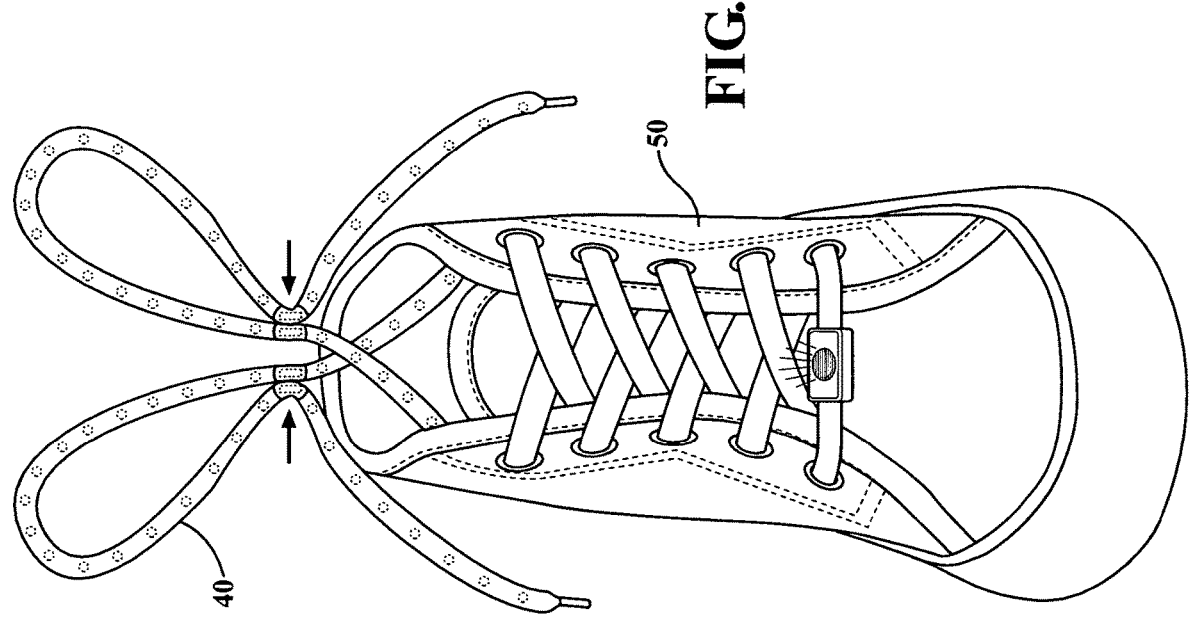
FIG. 7 is an illustration that shows the second step of two adjacent magnets on each side of the shoelace that holds the two loops in position.
Figure 8:
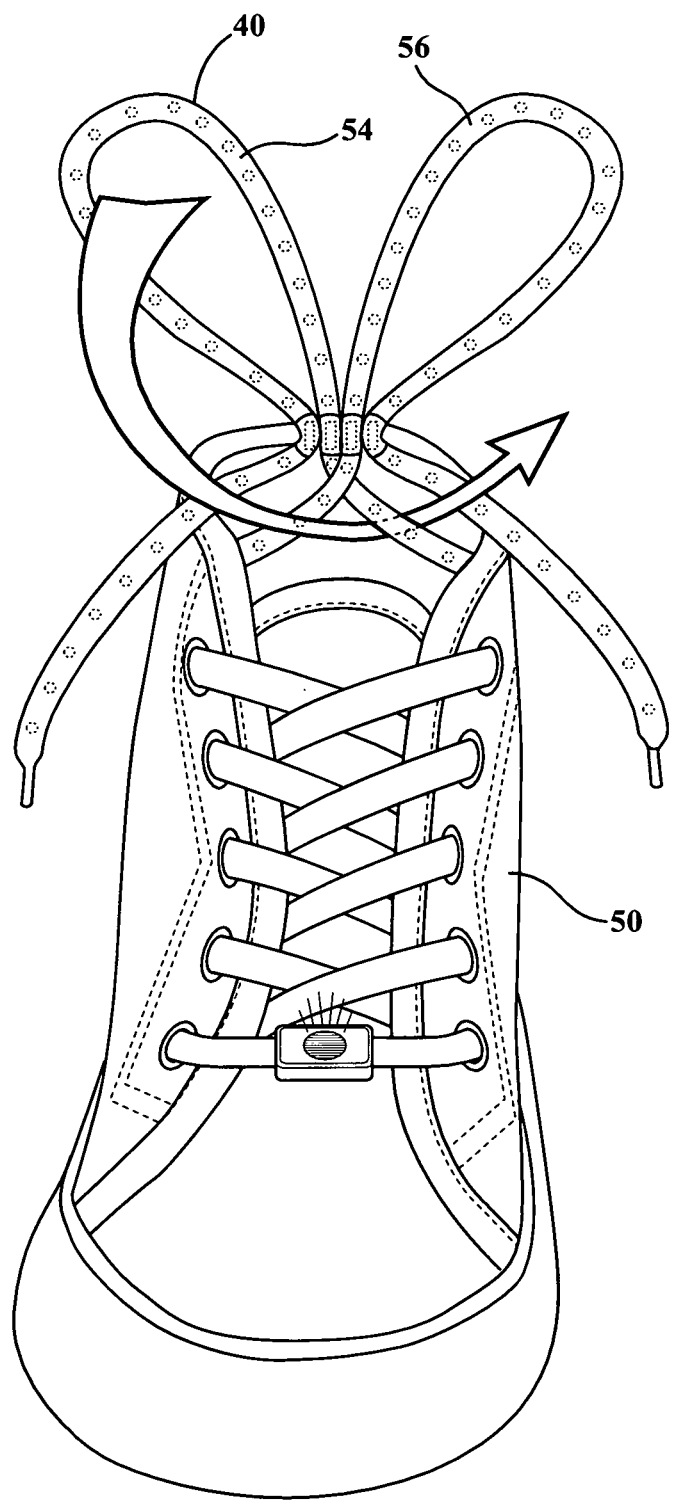
FIG. 8 is an illustration that shows the third and final step in one loop drawn under the eye of the shoelace and pulled together to fasten.

Having thus described my invention, I claim:

1. A pair of shoes for indicating to a child that correct shoe of the pair of shoes has been placed on a correct foot of the child, each shoe comprising:
   a planar device having a pressure-sensitive adhesive on one side, wherein the planar device is adapted to be inserted into the shoe in an area where a big toe of the child will be disposed when the shoe is worn on the correct foot, wherein the planar device includes a sensor configured to sense a pressure exerted by the big toe and a generator configured to responsively produce one of a vibration, a noise, and/or a light in response to a pressure exerted on the sensor of the big toe;
   a flexible shoelace in each shoe of the pair of shoes; and
   four magnets disposed within each flexible shoelace at equally spaced points aligned to attract one another to form two hoops.

2. The pair of shoes of claim 1, wherein each planar device is an inner sole of a respective one of the pair of shoes and each sensor is embedded within or upon a respective inner sole of a respective one of the pair of shoes.

3. The pair of shoes of claim 1, further comprising:
   a flat magnet disposed on a sole of each shoe of the pair of shoes,
   wherein each flat magnet is attached on an inner side of each shoe at a location that faces the other of the pair of shoes,
   whereby the flat magnets attract one another when the shoes are properly aligned for wearing by the child.

4. A pair of shoes for indicating to a child that correct shoe of the pair of shoes has been placed on a correct foot of the child, each shoe comprising:
   a planar device having a pressure-sensitive adhesive on one side, wherein the planar device is adapted to be inserted into the shoe in an area where a big toe of the child will be disposed when the shoe is worn on the correct foot, wherein the planar device includes a sensor configured to sense a pressure exerted by the big toe and a generator configured to responsively produce one of a vibration, a noise, and/or a light in response to a pressure exerted on the sensor of the big toe;
   a shoelaces; and
   a battery powered unit in the shoelace at a center point of the shoelace, wherein each shoelace further comprises an audio source with speakers configured to produce a confirmation sound when the child places either one of the pair of shoes on a correct foot.

5. The pair of shoes of claim 4, further comprising:
   a series of LED lights located in each shoelace,
   wherein each shoelace comprises a transparent or translucent material.

\* \* \* \* \*